(12) United States Patent
Henry et al.

(10) Patent No.: US 10,647,030 B2
(45) Date of Patent: May 12, 2020

(54) AUTOMATED CRAYON MELTING AND MOLDING DEVICE, METHOD, AND SYSTEM

(71) Applicant: CRAYOLA, LLC, Easton, PA (US)

(72) Inventors: Robert Henry, Bethlehem, PA (US); Ying K. Ho, Bethlehem, PA (US); Ramy Hanna, Easton, PA (US); Gregory R. Nungester, Asbury, NJ (US)

(73) Assignee: Crayola LLC, Easton, PA (US)

( * ) Notice: Subject to any disclaimer, the term of this patent is extended or adjusted under 35 U.S.C. 154(b) by 424 days.

(21) Appl. No.: 15/424,777

(22) Filed: Feb. 3, 2017

(65) Prior Publication Data

US 2017/0225368 A1   Aug. 10, 2017

Related U.S. Application Data

(60) Provisional application No. 62/291,975, filed on Feb. 5, 2016.

(51) Int. Cl.
*B29C 39/44* (2006.01)
*B29C 67/24* (2006.01)
(Continued)

(52) U.S. Cl.
CPC ............ *B29C 39/44* (2013.01); *B29C 39/003* (2013.01); *B29C 39/02* (2013.01); *B29C 39/24* (2013.01);
(Continued)

(58) Field of Classification Search
CPC ...................................................... B29C 39/44
See application file for complete search history.

(56) References Cited

U.S. PATENT DOCUMENTS 2,025,069 A    12/1935   Newton et al.
4,082,491 A     4/1978   Clymer et al.
(Continued)

OTHER PUBLICATIONS

International Preliminary Report on Patentability dated Aug. 16, 2018 in International Patent Application No. PCT/US2017/016664, 9 pages.

(Continued)

*Primary Examiner* — Larry W Thrower
(74) *Attorney, Agent, or Firm* — Shook, Hardy & Bacon, LLP (57) ABSTRACT

Embodiments of the invention are directed to an automated crayon-molding device comprising a crayon-receiving member, an automated heating element, a crayon-melting chamber that is heated to a melting temperature by the automated heating element, and at least one mold. The crayon-receiving member receives the crayon at one end and has a closure mechanism at another held, preventing the crayon from entering in the crayon-melting chamber until it reaches a melting temperature. Once the inside of the crayon-melting chamber, the crayon melts and drips into a mold configured to receive melted wax. Embodiments of the invention also include a method for assembling an automated crayon-molding device and a system for molding crayons that includes a crayon-receiving member, an automated heating element, a crayon-melting chamber, a drawer positioned underneath the crayon-melting chamber, and at least one mold.

18 Claims, 8 Drawing Sheets

(51) Int. Cl.
    *B43K 19/16*     (2006.01)
    *B29C 39/00*     (2006.01)
    *B29C 39/02*     (2006.01)
    *B29C 39/24*     (2006.01)
    *B29C 39/38*     (2006.01)
    *B29K 91/00*     (2006.01)
    *B29L 31/00*     (2006.01)

(52) U.S. Cl.
    CPC ............ *B29C 39/38* (2013.01); *B29C 67/241* (2013.01); *B43K 19/16* (2013.01); *B29K 2091/00* (2013.01); *B29L 2031/725* (2013.01)

(56) References Cited

U.S. PATENT DOCUMENTS

| | | | | |
|---|---|---|---|---|
| 2005/0008729 A1* | 1/2005 | Fernandez | ............ | A63H 33/001 425/256 |
| 2005/0189680 A1* | 9/2005 | Cziraky | ................ | B43K 19/16 264/319 |
| 2015/0336300 A1* | 11/2015 | McCauley | ............ | B29B 13/022 264/319 |

OTHER PUBLICATIONS

Examiner's Report dated Oct. 9, 2018 in Canadian Patent Application No. 3,011,370, 4 pages.
International Search Report and Written Opinion dated Jun. 6, 2017 for International Patent Application No. PCT/US17/16664, 13 pages.
Examination Report No. 1 dated Mar. 18, 2019 in Australian Patent Application No. 2017214686, 5 pages.
Office Action dated Jun. 25, 2019 in Canadian Patent Application No. 3,011,370, 5 pages.

* cited by examiner

AUTOMATED CRAYON MELTING AND MOLDING DEVICE, METHOD, AND SYSTEM

PRIORITY CLAIM

This application claims priority to U.S. Provisional Patent Application No. 62/291,975, filed Feb. 5, 2016, having the entire contents of which is hereby incorporated by reference.

SUMMARY

Embodiments of the invention are defined by the claims below, not by this summary. A high-level overview of various aspects of the invention provides an overview of the disclosure and introduces a selection of concepts that are further described in the detailed description section below. This summary is not intended to identify key or essential features of the claimed subject matter or to be used as an aid in isolation to determine the scope of the claimed subject matter.

In brief and at a high level, this disclosure describes, among other things, an automated device, method, and system for molding a crayon into a chosen shape, such as into a three-dimensional crayon figurine. In one aspect, the automated crayon-molding device includes a crayon-receiving member, an automated heating element, a crayon-melting chamber, and at least one mold. The crayon-receiving member may include an opening at a first end configured to receive at least one crayon. Such opening may be manually operated, in some embodiments, while in other embodiments the crayon-receiving member may include an automated opening and closing feature that restricts access to an internal portion of the crayon-receiving member based on a phase of the crayon molding process.

Once the inside of the crayon-melting chamber is heated to a specific melting temperature by the automated heating element, one or more portions of an unmelted crayon are permitted to move into the crayon-melting chamber from the crayon-receiving member. Aspects of the automated heating element include a temperature-sensing mechanism that is configured to regulate the amount of heat produced based on the present temperature inside the crayon-melting chamber.

In some aspects, the crayon-receiving member may include a travel stop that retains a crayon inside the crayon-receiving member until it is released into the crayon-melting chamber. Additionally, in some embodiments, the crayon-receiving member includes a closure mechanism, such as a door, at its second end that keeps the crayon and/or multiple portions of different crayons retained by the crayon-receiving member, from passing into the crayon-melting chamber until the crayon-melting chamber reaches a pre-heated melting temperature. When the crayon-melting chamber reaches a threshold melting temperature, the door may open to allow the crayon to move into and/or pass through the crayon-melting chamber where it will be heated to a threshold melting temperature and melted into a liquid crayon. In further embodiments, the melted crayon may gradually pass through of an opening at the base of the crayon-melting chamber and drip into an opening of a mold. In some aspects, the mold includes a cavity in a predefined shaped, such as a predefined three-dimensional shape with the cavity having a volume corresponding to a maximum amount of melted crayon provided via the crayon-melting chamber. The melted crayon may then fill the cavity and eventually cool within the mold, forming a melted-crayon figurine in the shape of the cavity. Embodiments of the invention also include a method for assembling an automated crayon-molding device and a system for molding crayons that includes a crayon-receiving member, an automated heating element, a crayon-melting chamber, a drawer positioned underneath the crayon-melting chamber, and at least one mold.

DESCRIPTION OF THE DRAWINGS

Illustrative embodiments of the invention are described in detail below with reference to the attached drawing figures, and wherein.

DETAILED DESCRIPTION

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various disclosed steps unless and except when the order of individual steps is explicitly described.

Embodiments of the invention include, among other things, an automated crayon-molding device comprising: a crayon-receiving member having an opening at a first end configured to receive at least one crayon and a closure mechanism at a second end; an automated heating element; a crayon-melting chamber configured to receive the at least one crayon from the crayon-receiving member; and at least one mold configured to receive the melted wax from the crayon-melting chamber. The inside of the crayon-melting chamber is heated by the automated heating element, and when the inside of the crayon-melting chamber reaches a melting chamber, the closure mechanism on the crayon-receiving member opens, causing the crayon to drop into the crayon-melting chamber from the crayon-receiving member. As the crayon melts within the crayon-melting chamber, melted crayon drips into the mold, where it forms a particular crayon shape, such as a wax-based figurine.

Embodiments of the invention also include a method for assembling an automated crayon-molding device, wherein the method comprises: providing a crayon-receiving member having an opening at a first end configured to receive at least one crayon and a closure mechanism at a second end; coupling the second end of the crayon-receiving member to a crayon-melting chamber; coupling an automated heating element to the crayon-melting chamber such that the automated heating element heats an inside of the crayon-melting chamber; providing a temperature-sensing mechanism that detects when the inside of the crayon-melting chamber reaches a melting temperature to allow the closure mechanism on the crayon-receiving member to open when the inside of the crayon-melting chamber reaches the melting temperature; and positioning a wax-receiving area underneath the crayon-melting chamber, wherein the wax-receiving area is configured to hold a mold that receives melted wax that drips from the crayon-melting chamber.

A further embodiment includes a crayon-molding system comprising: a crayon-receiving member having an opening at a first end configured to receive at least one crayon and a closure mechanism at a second end; an automated heating element; a crayon-melting chamber configured to receive the at least one crayon from the crayon-receiving member and that has at least one opening at a bottom portion; a drawer positioned underneath the crayon-melting chamber; and at least one mold having a cavity and configured to receive melted wax when placed in the drawer. The automated heating element heats the inside of the crayon-melting chamber. When the inside of the crayon-melting chamber reaches a melting temperature, the closure mechanism on the second end of the crayon-receiving member opens, permitting the crayon to travel from the crayon-receiving member to the crayon-melting chamber. As the crayon melts within the crayon-melting chamber, melted crayon drips into the mold placed in the drawer.

In various embodiments, a crayon may refer to a wax-containing drawing instrument, a crayon body, a portion of a crayon body, a cylindrical crayon body and/or other shape of crayon body providing a marking instrument for making crayon markings on a surface, such as a coloring instrument comprising at least one form of wax and at least one form of colorant. In one aspect, a crayon may refer to an instrument made from paraffin wax, color pigment, and/or any additional components within the scope of embodiments herein. Accordingly, a melted crayon body may generally be referred to as "melted wax," without departing from the scope of what is referred to as the melted components of one or more crayons.

In some aspects, a crayon may be any wax/pigment combination configured to melt into a liquid wax state during heating at a particular threshold temperature, and to cool into a solidified state as the melted crayon cools. Embodiments of the invention may be described with respect to a crayon received by the crayon-receiving member, such as a Crayola® crayon having a tapered tip and a generally cylindrical body. In further embodiments, the crayon may include a wax component and a colorant/pigment that generates transferable markings for drawing on a surface, such as a melted crayon made from wax, having one or more different colors that generate corresponding colored markings on a surface. Once cooled inside a removable mold, the melted crayon filling the mold may become solidified into a three-dimensional shape, with the resulting shape retaining its drawing capabilities (i.e., the molded crayon still marking as a regular crayon body).

In some embodiments of the invention, a crayon-molding device, method, and system provides a series of retaining, pre-heating, melting, molding, cooling, and releasing steps following a logic of mechanically controlled actions associated with the crayon melting and molding device. As such, embodiments of the invention are directed to a method of utilizing the melting and molding device, according to instructions, that when executed by a computing device having a processor and a memory (e.g., a microcontroller), causes one or more actions by the crayon-molding device, such as activating, deactivating, thermoregulating and/or otherwise controlling one or more various features of the crayon-molding device during a method of melting a received crayon into a positioned mold a process having threshold preheat, melt, and release temperatures.

In some aspects, a control component inside a portion of the crayon-molding device, such as a microcontroller, may be configured to execute one or more instructions for operating the crayon-molding device according to a particular sequence of steps, each performed for a particular duration of time corresponding to a state of the device components and a target and/or threshold temperature of the melted and/or melting crayon and preheated and/or heated components. Accordingly, some embodiments of the invention provide a system and method for generating a melted and re-molded crayon (i.e., a crayon having been previously molded into a traditional, cylindrical shape), with various crayon-positioning control features, such as a first end opening that remains open for receiving a crayon and shuts closed when the crayon is permitted to travel into the preheated crayon-melting component. In further embodiments, a system and method for generating a melted and re-molded crayon includes multiple crayon-melting control features that may work, at least in part, with one or more functions of the crayon-positioning control features. In this example, the crayon-melting control features may include a thermoregulator coupled to at least a portion of the crayon-melting component for heating a crayon traveling through the crayon-melting component, preheating the crayon-melting component to a desired temperature for melting such crayons, maintaining the crayon-melting component at the desired temperature (amidst duration of pre-heat time and repeated cycles of crayon molding, and returning the crayon-melting component to a steady and/or resting state at an intermediate heat level (i.e., partially pre-heated for melting, above cold-start level), adjusting a steady state temperature based on a duration of use, or any combination of heating, cooling, partially heating, partially cooling, maintaining, adjusting and/or otherwise optimizing a melting temperature for optimal crayon melting and molding. For example, a crayon-melting control feature may include an active state adjustment mechanism that prepares the crayon-melting component for melting a first crayon (e.g., a first pre-heat/startup phase), maintains a crayon-melting component temperature within a target temperature range throughout additional, subsequent melting cycles (e.g., after first crayon, apply first amount of additional heat to maintain target melt temperature; after second crayon, apply second amount of additional heat to maintain target melt temperature, etc.), initiate a reduced-heat maintenance phase (without returning a temperature to a cold starting temperature after a duration of rest time between melting cycles) to reduce a duration of preheating required for subsequent crayon-melting cycles.

In further embodiments, one or more crayon-positioning control components and one or more crayon-melting control components may interact with one or more mold-positioning components, which may further include a mold-positioning mechanism that selectively secures a mold receptacle proximate the crayon-melting component, one or more mold drawer sensing mechanisms for providing an indication of a mold positioned inside the mold drawer. In further aspects, a mold-positioning component may include one or more features for selectively controlling a position of the mold drawer, such as an opening, closing, and locking control feature. Although described with respect to a single component or multiple components, it will be understood that embodiments of the invention may include multiple components or individual components that perform multiple or single functions during crayon molding. Similarly, a device feature of the crayon-molding device may include multiple parts that together perform the function of such device feature and/or component.

Further, a system and/or control component utilized throughout a particular phase of the automated crayon-molding process may be described as performing, activating, deactivating, interrupting, initiating, and/or delaying one or more phases of crayon molding, but in some embodiments, one or more actions of one or more phases of the process may be carried out by one or more components, according to the same or similar order of operations, with simultaneous mechanical, electrical, and/or visual activation of process and/or safety features. For example, the crayon-positioning component may release a crayon from a second end at the same time that an opening at the first end is closed, while the release of the crayon may be activated in response to a threshold temperature being satisfied by the preheated crayon-melting component. In another example, embodiments of the crayon-molding device may include a mold drawer sensing component that proceeds through coordinated function with at least the crayon-melting component, such as by initiating preheating once the mold drawer is closed, locking the mold drawer while the crayon is being melted into the mold, and unlocking the mold drawer once a threshold amount of cooling-down time has passed.

In additional embodiments of the invention, a crayon-molding device, method and system may include one or more crayon-positioning features, one or more crayon-melting features, and one or more crayon-molding features, which work together or separately from each other and in response to one or more control commands from one or more control components of the crayon-molding apparatus.

With reference now to the figures, apparatus, methods and systems for providing a crayon-molding device are described in accordance with embodiments of the invention. Various embodiments are described with respect to the figures in which like elements are depicted with like reference materials.

Figure 1:
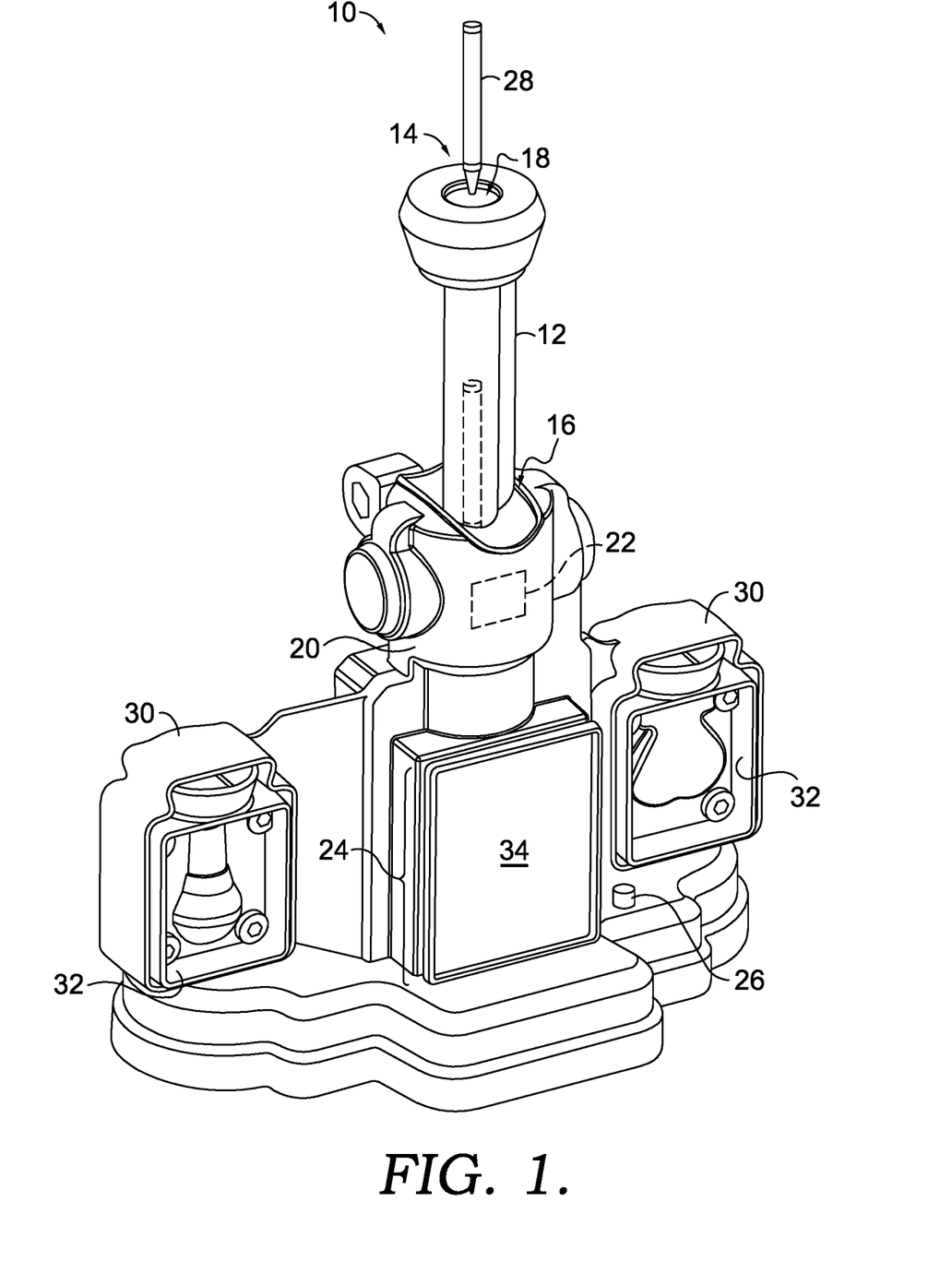
FIG. 1 is a perspective view of an automated crayon-molding device, in accordance with an embodiment of the invention.
Figure 2:
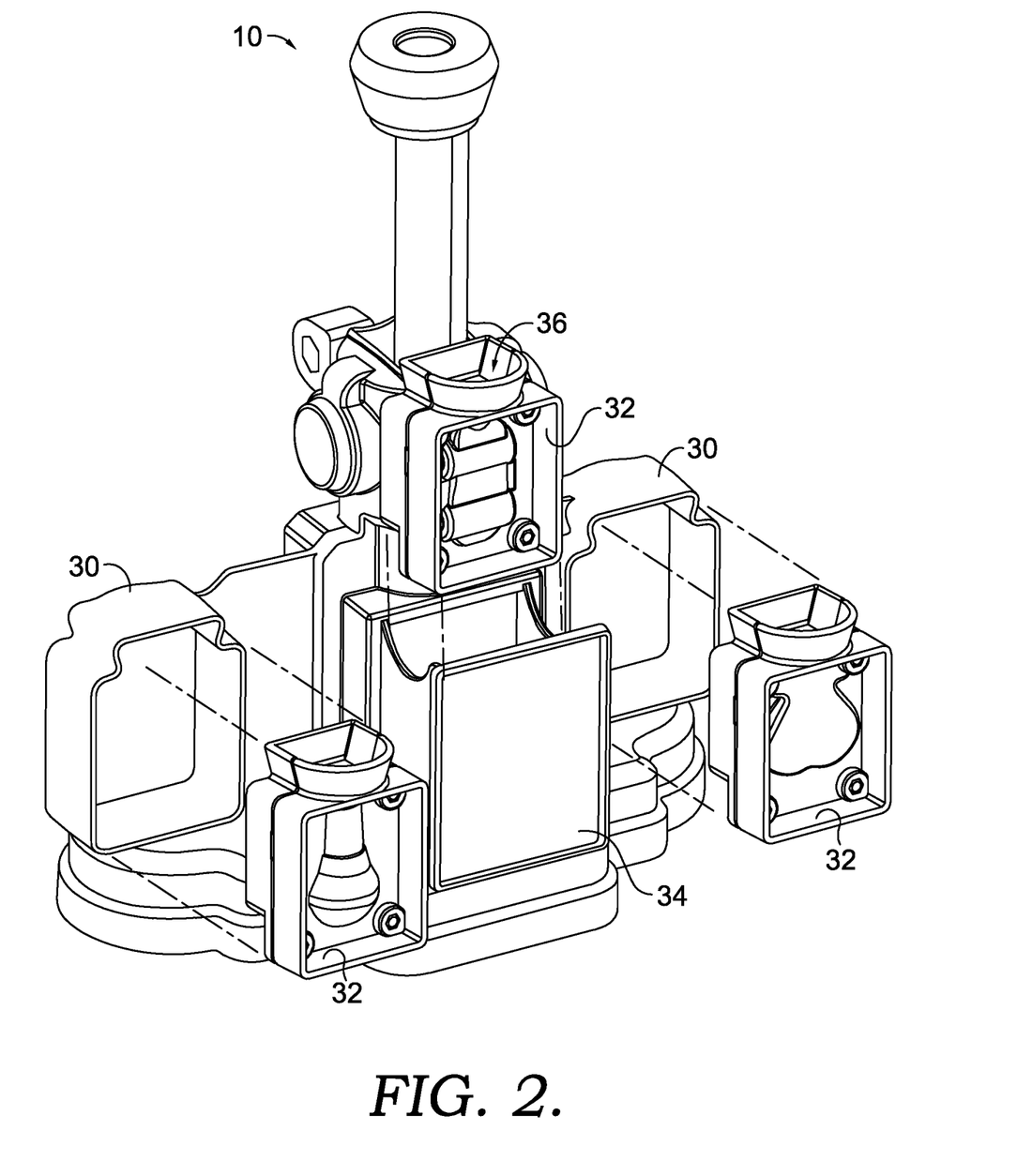
FIG. 2 is a perspective view of the automated crayon-molding device of FIG. 1, in accordance with an embodiment of the invention.
Figure 3:
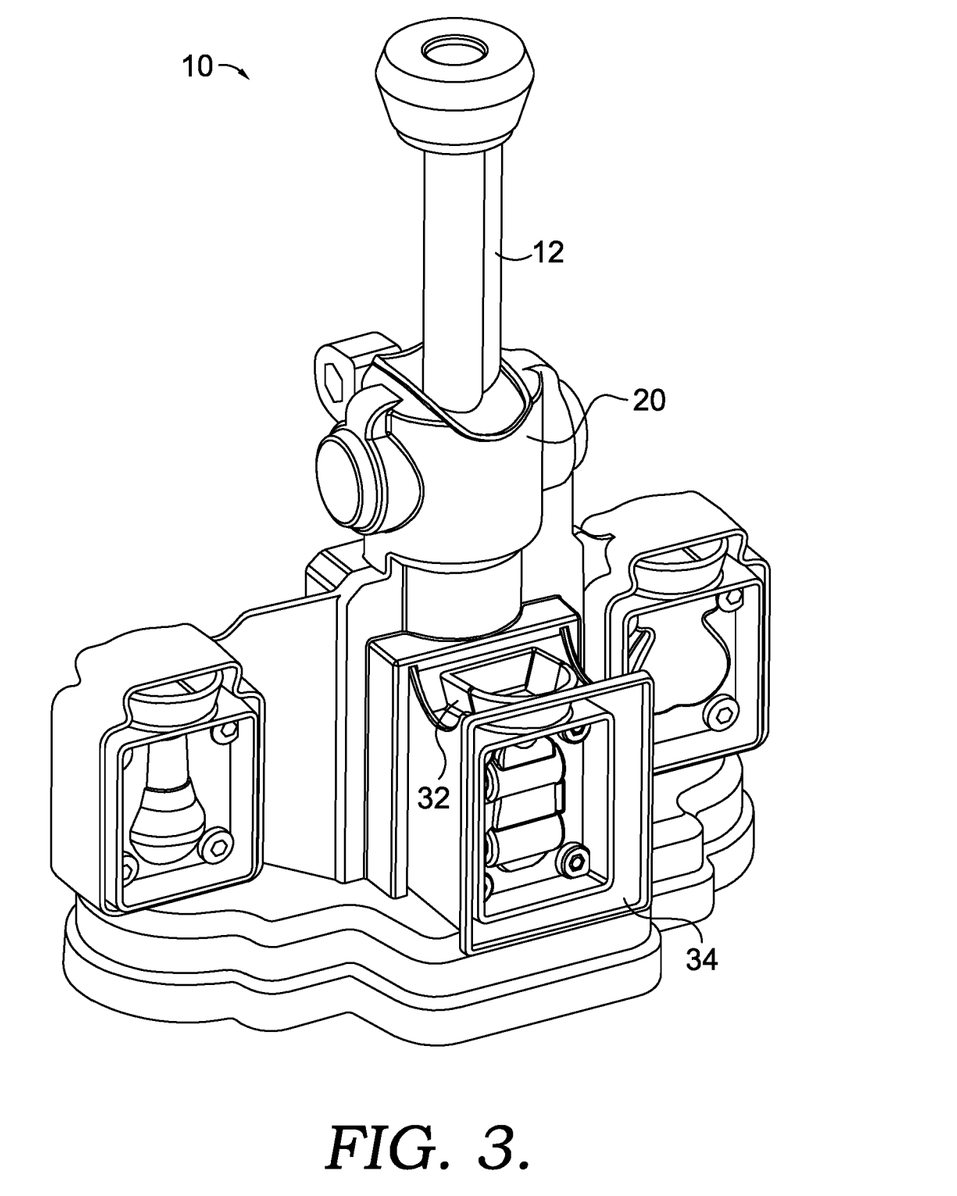
FIG. 3 is a perspective view of the automated crayon-molding device of FIG. 1 with the drawer in an open position, in accordance with an embodiment of the invention.

FIGS. 1-3 provide perspective views of an exemplary automated crayon-molding device 10 in accordance with an embodiment of the invention. Generally, the automated crayon-molding device 10 may be used to melt crayons 28 and mold the melted crayon product (referred to herein as the melted "wax") into predefined shapes using molds 32. The automated crayon-molding device 10 may include a crayon-receiving member 12, a crayon-melting chamber 20, and a wax-receiving area 24. In exemplary embodiments, the crayon-receiving member 12 has a first end 14 and a second end 16. At the first end 14, the crayon-receiving member may include an opening 18 through which a crayon 28 may be dropped into the crayon-receiving member 12. At the second end 16, the crayon-receiving member 12 may be coupled to the crayon-melting chamber 20. Though not shown from this view, it is contemplated that the crayon-receiving member 12 may further include an opening at the second end 16 through which a crayon 28 passes to enter the crayon-melting chamber 20.

In exemplary embodiments, the crayon-receiving member 12 comprises a tubular structure. The diameter of the opening 18 at the first end 14 and of the hollow interior of the crayon-receiving member 12 may generally correspond to the diameter of a crayon 28. In some embodiments, the length of the crayon-receiving member 12 may generally correspond to the length of crayon material that, when melted, may be used to produce sufficient amount of wax to fill a mold 32. For example, in one embodiment, the mold 32 may be configured to hold a total volume of melted wax from at least two crayons 28, and the crayon-receiving member 12 may therefore include the length of two crayons 28. In other embodiments, the mold 32 may hold a total volume of melted wax from one crayon 28, and the corresponding crayon-receiving member 12 may include the length of only one crayon 28. In exemplary aspects, the crayon-receiving member 12 may be large enough to contain only the number of crayons 28 that will fill the mold 32 such that excess wax cannot be produced when using the automated crayon-molding device 10. In further aspects, an additional mold volume may be added to the mold 32 so as to prevent overflow of the mold upon inadvertent insertion of additional crayon 28 material. Such additional material may later be removable from the final, molded product, such as an end plug on a final molded product based on overfilling.

In further embodiments of the invention, the crayon-melting chamber 20 may include a heating element 22, which is represented by the dashed line on the crayon-melting chamber 20 in FIGS. 1-3. The heating element 22, discussed in greater detail below, may be configured to heat the inside of the crayon-melting chamber 20, which in turn melts a crayon 28 inside of the crayon-melting chamber 20. In some aspects, the heating element 22 includes a control component (e.g., a microcontroller for automated processing of one or more steps in the crayon melting and molding process) that activates or deactivates one or more features of the crayon-melting chamber 20 and/or one or more features of additional components, such as other mechanical locking, unlocking, stopping/blocking, and/or releasing devices of the crayon-molding device. It will be understood that one or more microcontroller components and one or more heating elements may be incorporated into one or more features of the crayon molding component, and that such controlling and heating features of the crayon-molding device may be independently and automatically controlled by a control component integrated into a different part of the device, while still interacting with the heating element 22.

Embodiments of the invention include an activation button 26, which may be placed on the exterior of the automated crayon-molding device 10 and may be used to turn on the heating element 22 and initiate the crayon-melting process. Positioned underneath the crayon-melting chamber 20 may be a wax-receiving area 24 that receives melted wax from the crayon 28 being melted in the crayon-melting chamber 20. Accordingly, the crayon-melting chamber 20 may include one or more holes at its base (shown as 50 in FIG. 6) through which melted wax may travel.

In exemplary aspects, the wax-receiving area 24 includes a drawer 34 that holds a mold 32, as shown in FIGS. 2-3. The drawer 34 may be pulled out from underneath the crayon-melting chamber 20 when the drawer 34 is in an unlocked state, and a mold 32 may be placed into the drawer 34. The area inside the drawer 34 may generally correspond to the area of one mold 32 so that one mold 32 fits within the drawer 34 but does not have room to move around within the drawer 34, according to embodiments.

In further embodiments of the invention, the mold 32 (which will be described in greater detail with reference to FIGS. 8-9) is generally configured to receive melted wax from the crayon-melting chamber 20 through a mold opening 36 at the top of the mold 32. In addition to a mold 32 being placed in the drawer 34, the automated crayon-molding device 10 may include one or more mold holders 30 to store molds 32 that are not in use. For example, the exemplary embodiment illustrated in FIGS. 1-3 has two mold holders 30 flanking the drawer 34. Molds 32 stored in the mold holders 30 may be easily accessed by pulling out the molds 32 from the mold holders 30. Using mold holders 30 increases the amount of molds 32 that may be easily used with the automated crayon-molding device 10. In alternative embodiments, however, the automated crayon-molding device 10 may include a carousel of multiple molds that can be moved, either manually or through an automated function, so that each mold 32 may be placed in the wax-receiving area 24 to be filled with melted wax.

Figure 4:
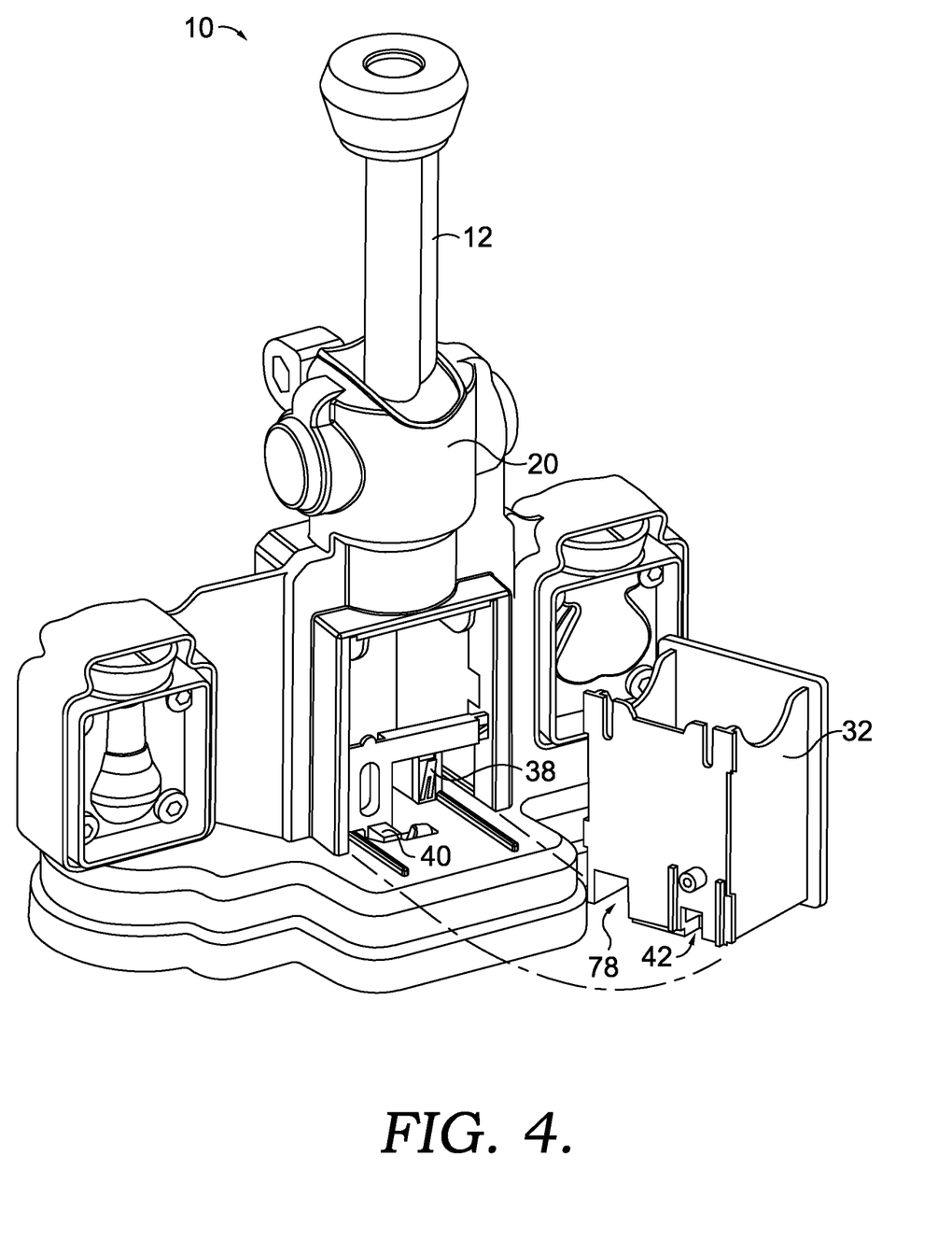
FIG. 4 is a perspective view of the automated crayon-molding device of FIG. 1 with the drawer removed, in accordance with an embodiment of the invention.

As will be understood, one potential safety hazard with a technology utilizing melted wax relates to burns from melted wax, which may occur if a drawer or mold were not properly in place or if melted wax overflows from the mold. Accordingly, the automated crayon-molding device 10 may include one or more mechanisms to ensure safe and efficient melting of the crayon 28, ensure proper positioning of the mold 32 within the drawer 34, and resolve overflow risk via melted-wax quantity limitations. For example, as shown in FIG. 4, the automated crayon-molding device 10 may include one or more drawer-sensing mechanisms 38 that are configured to detect when the drawer 34 is fully closed underneath the crayon-melting chamber 20. The drawer-sensing mechanism 38 may then prevent activation of the heating element 22 unless and until the drawer 34 is in a fully closed position.

Similarly, the automated crayon-molding device 10 may also include one or more mold-sensing mechanisms 40 that detect when a mold 32 is placed within a fully closed drawer 34. In some embodiments, the mold-sensing mechanism 40 may prevent activation of the heating element 22 unless a mold 32 is within with drawer 34. This feature may be designed, in some embodiments, to avoid hot wax falling into a drawer 34 without a mold 32 in the drawer 34 to receive the wax. In further aspects, the mold-sensing mechanism 40 may be a part of a back wall or the floor of the wax-receiving area 24 and may be aligned with a portion 42 of the drawer 34 that is cut away to expose a mold 32 when a mold 32 is within the drawer 34. Embodiments of the mold-sensing mechanism 40 may detect the part of the mold 32 that is exposed by the cut-out portion 42 of the drawer 34 when the drawer 34 is closed.

In some embodiments, once the drawer 34 contains a mold 32 and is fully closed underneath the crayon-melting chamber 20, the heating element 22 may be activated by a user. In exemplary aspects, the automated crayon-molding device 10 includes an activation button 26 to initiate heating. This activation button 26 may also lock the closed drawer 34 in place so that a drawer cannot be removed during the melting process. In some aspects, a user may insert a crayon 28 in the opening 18 at the first end 14 of the crayon-receiving member 12 before or immediately after pressing the activation button 26. In alternative aspects, the activation button 26 may be pressed only after a crayon 28 is inserted into the crayon-receiving member 12.

Once a crayon 28 is in the crayon-receiving member 12, it may travel into the crayon-melting chamber 20, which is heated by the heating element 22. Embodiments of the heating element 22 may use a variety of convection, conduction, or radiation mechanisms to heat the inside of the crayon-melting chamber 20. In exemplary embodiments, the heating element 22 may be automated and powered by a power source. In some aspects, the automated heating element 22 is low powered, making the automated crayon-molding device 10 safe for use as a children's toy. For example, the heating element 22 may be powered by a 12-watt adapter. In further aspect, one or more features of the crayon-molding device 10 may be activated/de-activated in response to a controlling mechanism, such as a microcontroller, that permits opening and closing of stop/door features, turning on and turning off of heating features, and opening and closing of locking mechanism on the drawer component. As such, a logic of control commands may be automatically coordinated within a microcontroller mechanism without requiring user intervention. In this aspect, a user may insert a crayon 28 into the crayon-receiving member 12, insert a mold in the drawer and close the drawer, and push a single button for activating the entire process flow.

In exemplary aspects, the heating element 22 may be temperature controlled. The heating element 22 transfers sufficient heat to the crayon-melting chamber 20 to reach and maintain a specific temperature inside of the crayon-melting chamber 20 during the melting process, according to embodiments of the invention. For instance, the crayon-melting chamber 20 may reach a melting temperature that is within a range of about 220 degrees Fahrenheit to 310 degrees Fahrenheit. For example, in one embodiment, the melting temperature is between 260 degrees Fahrenheit and 270 degrees Fahrenheit. Because the heating element 22 is temperature controlled, it will continue heating the crayon-melting chamber 20 until it reaches the melting temperature, regardless of the amount of time it takes, in embodiments. Though not shown, it is contemplated that a microcontroller may be used to regulate and control the heating element 22. In aspects, while the heating element 22 heats the inside of the crayon-melting chamber 20, the external surfaces of the automated crayon-molding device 10 are unaffected by the heating element 22. In other words, the external surfaces do not heat up during the preheating and melting process so that a user can safely touch the outside of the automated crayon-molding device 10 when in use, according to embodiments.

Additionally, the heating element 22 may be configured to heat the crayon-melting chamber 20 from multiple different starting temperatures. For example, the heating element 22 may determine a current temperature of the crayon-melting chamber 20, and apply only a necessary amount of preheating to the chamber 20 to reach a threshold melting temperature. In further aspects, a user may have recently melted a crayon using the crayon-molding device 10. As such, the heating element 22 may require a shorter amount of time to heat to the threshold crayon-melting temperature, while not overheating due to the prior present heat.

In exemplary aspects, the automated crayon-molding device 10 prevents a crayon 28 from entering the crayon-melting chamber 20 until the inside of the crayon-melting chamber 20 is preheated to the melting temperature. For instance, a mechanism may be provided in the crayon-receiving member 12 that prevents the crayon 28 from moving into the crayon-melting chamber 20 as shown in the cross-sectional view of the crayon-receiving member 12 shown in FIG. 5.

Figure 5:
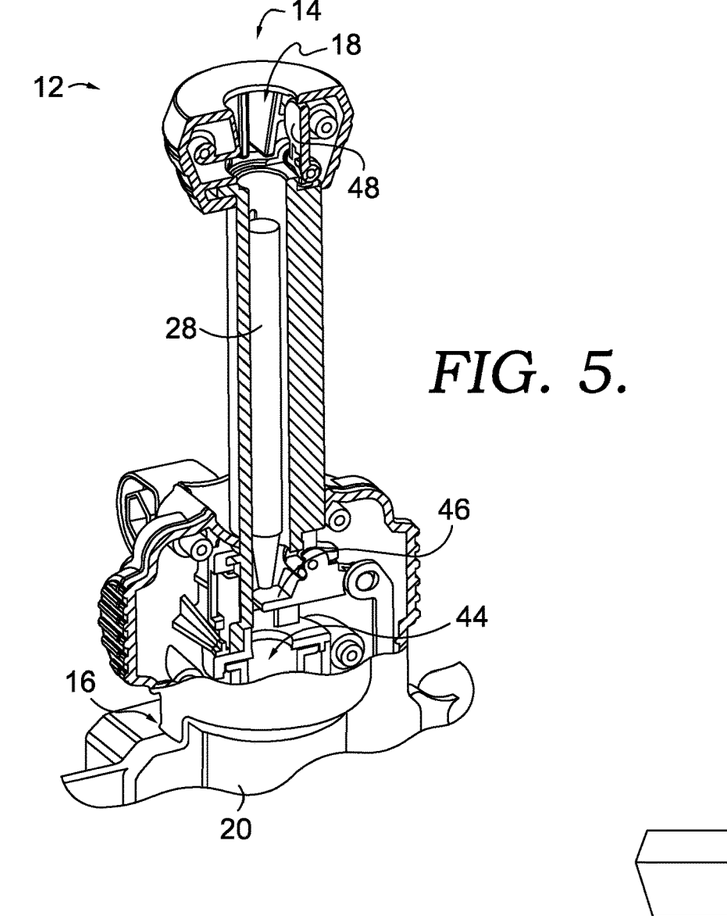
FIG. 5 is an expanded view of a crayon-receiving member of the automated crayon-molding device of FIG. 1 with a portion cut away, in accordance with an embodiment of the invention.

As previously discussed, the crayon-receiving member 12 may include an opening 18 at its first end 14 through which a crayon 28 enters the crayon-receiving member 12 and may include an opening 44 at its second end 16 that opens up into the crayon-melting chamber 20. Above the opening 44 at the second end 16 of the crayon-receiving member 12 may be a door 46 covering at least part of the opening 44. When the crayon 28 is initially dropped into the crayon-receiving member 12, the door 46 prevents the crayon 28 from entering into the crayon-melting chamber 20. Specifically, the door 46 may prevent the crayon 28 from entering the crayon-melting chamber 20 until the inside of the crayon-melting chamber 20 reaches a melting temperature, according to embodiments of the invention.

Once the melting temperature is reached in the crayon-melting chamber 20, the door 46 may open, causing the crayon 28 to drop down into the crayon-melting chamber 20. In some aspects, preventing the crayon 28 from entering the crayon-melting chamber 20 until it has reached the melting temperature ensures even and consistent melting of the crayon 28. If a crayon 28 is slowly melted while the inside of the crayon-melting chamber 20 is heated to the melting temperature, some of the melted wax received in the mold 32 may not be fully melted, which would adversely impact the molded wax formed. In some embodiments, the microcontroller that regulates the heating element 22 also controls the door 46 opening and closing.

In addition to the door 46 blocking access to the crayon-melting chamber 20, the crayon-receiving member 12 may have a top door 48 that configured to cover at least part of the opening 18 at the first end 14 of the crayon-receiving member 12 and that restricts access into the interior of the crayon-receiving member 12. The top door 48 may be initially open to allow a user to place one or more crayon 28 in the crayon-receiving member 12, but the top door 48 may close at some point during the crayon-molding process to prevent additional crayons 28 from being placed in the crayon-receiving member 12. In some embodiments, because the volume of the crayon-receiving member 12 is designed to fit only the amount of crayons 28 corresponding to the volume of wax a mold 32 can hold, preventing additional crayons 28 from entering the automated crayon-molding device 10 while crayons 28 are being melted prevents too many crayons 28 from being melted.

Closing of the top door 48 may automatically occur when the heating element 22 is activated, or it may occur when the inside of the crayon-melting chamber 20 reaches the melting temperature and the door 46 at the second end 16 of the crayon-receiving member 12 opens. As shown in FIG. 5, in some embodiments, the top door 48 is set below the opening 18 of the crayon-receiving member 12, rather than sitting on top of the opening 18. A lower placement of the top door 48 partially restricts access to the top door 48, which helps ensure that the top door 48 cannot be accidently broken off or removed by a user.

Figure 6:
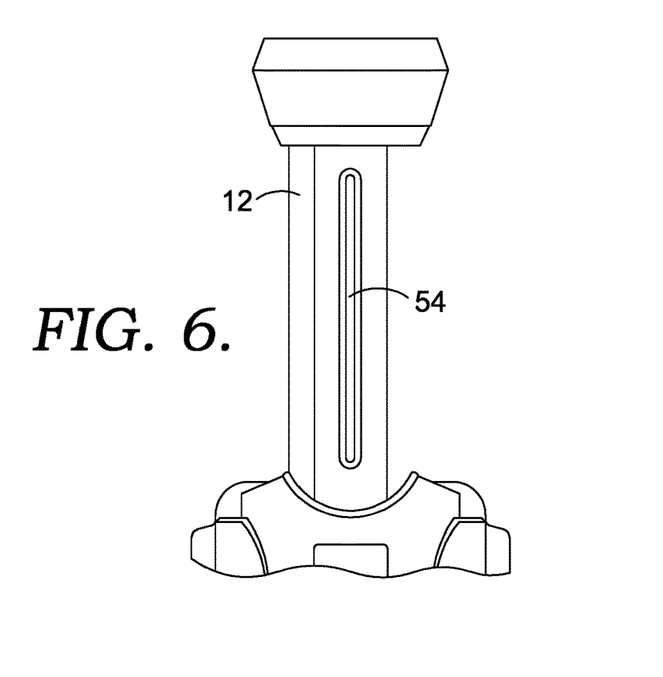
FIG. 6 is a rear view of the crayon-receiving member of FIG. 5, in accordance with an embodiment of the invention.
Figure 7:
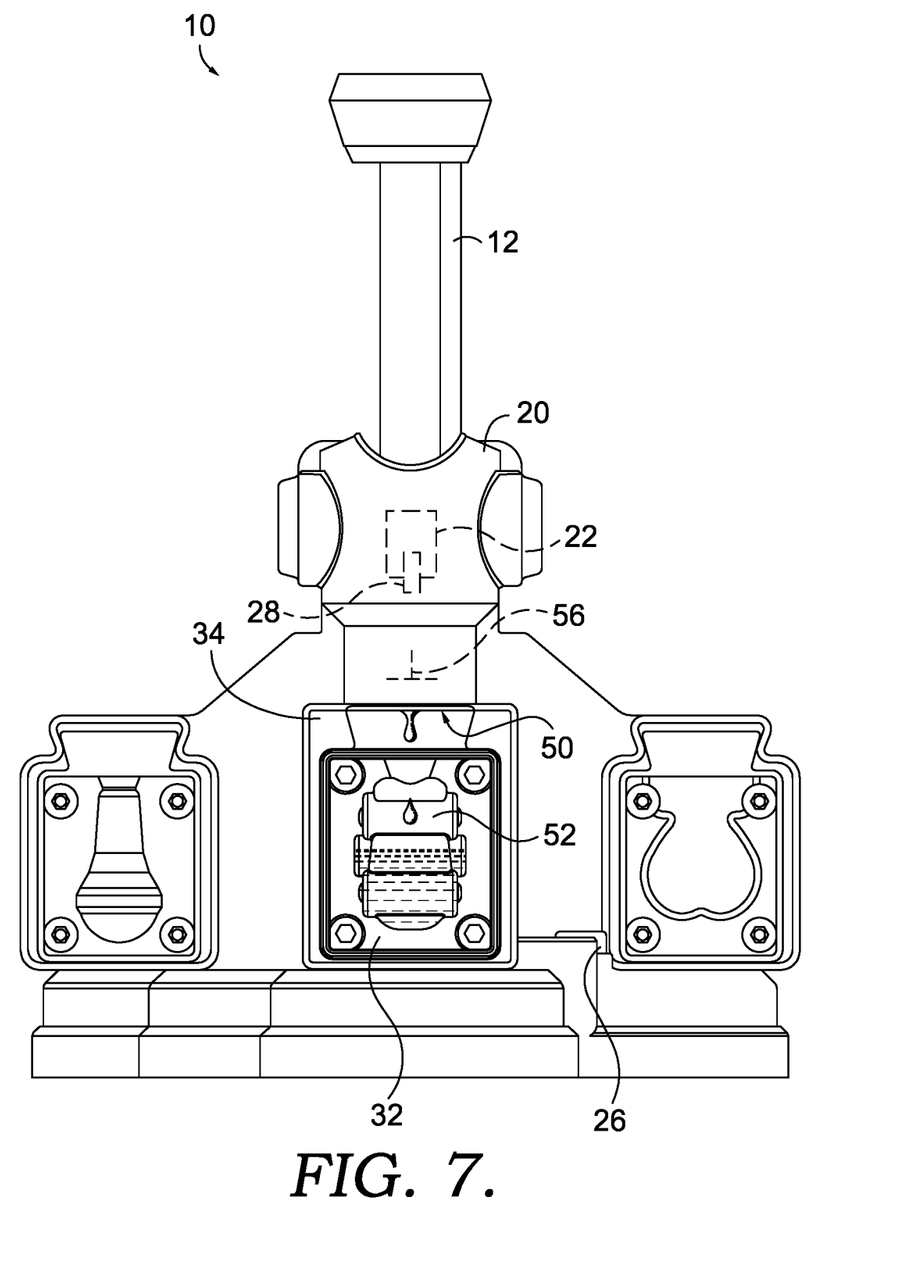
FIG. 7 is a front view of the automated crayon-molding device of FIG. 1 during the melting stage, in accordance with an embodiment of the invention.

Another feature of the crayon-receiving member 12 is shown in the rear view provided in FIG. 6. As shown in FIG. 6, the crayon-receiving member 12 may include an adjustment slot 54 for dislodging a crayon 28 stuck in the crayon-receiving member 12. The adjustment slot 54 may be designed to allow a user to vertically advance or retract a crayon 28 to a proper position. In exemplary aspects, the adjustment slot 54 may be wide enough to accommodate a small tool for advancing the crayon 28, such as a toothpick, but is not large enough for a child to get his or her fingers stuck in the device.

Turning to FIG. 6, once the drawer 34 is fully closed with a mold 32 inside and the inside of the crayon-melting chamber 20 reaches a threshold melting temperature, the crayon 28 may be melted inside the crayon-melting chamber 20. As previously mentioned, there may be one or more holes at the base 50 of the crayon-melting chamber 20 through which melted wax from the crayon 28 may drip into a mold 32 positioned below the crayon-melting chamber 20. The mold 32 may receive the melted wax through an opening 36 at the top of the mold 32, and the melted wax may settle within a predefined cavity 52 in the mold 32. In aspects, the crayon-melting chamber 20 may provide for a continuous drip of the melted wax into the mold 32. For example, based on pre-heating the crayon-melting chamber 20 to a particular threshold melting temperature, the crayon 28 is configured to melt at a more consistent rate and with one or more consistent melting characteristics as compared to a crayon melted in a cold-start chamber. In alternative embodiments, there may be another door located at the base 50 of the crayon-melting chamber 20 that opens only after all of the crayon 28 has melted. In this embodiment, the wax pours into the mold 32 at one time rather than at continuous drip.

Some embodiments may include a strainer 56 near the base 50 of the crayon-melting chamber 20 to break the surface tension in the melted wax. By breaking up the surface tension in the melted wax, the strainer 56 creates a more even and continuous flow of the wax into the mold 32, according to embodiments. The strainer 56 may include various mechanisms and configurations including a single bar, a T-bar, a crossbar, a ring, a layer of mesh, or any other device to break the surface tension of the melted wax. The strainer 56 may also filter out non-crayon residue that may have gotten into the automated crayon-molding device 10, such as a paper crayon wrapper. Though not shown, the base 50 of the crayon-melting chamber 20 may also include a built-in scraper or cleaning tool designed to remove residual wax, and/or an additional safety/cleaning feature for maintaining the flow characteristics of the device upon repeated uses.

As the melted wax continuously drips from the crayon-melting chamber 20, layers of wax accumulate from the bottom of the mold up towards the top, as shown by the gradient lines in FIG. 6. In one embodiment, the time within which the crayon 28 completely melts is the melting time. In some aspects, the melting time is between two minutes and five minutes. In exemplary aspects, the melting time is about three minutes.

The wax then cools as it fills the predefined cavity 52 of the mold 32. The cooled wax then solidifies into the shape of the predefined cavity 52. In some aspects, the automated crayon-molding device 10 allows for a cooling period, which may be between two minutes and five minutes, before the drawer becomes unlocked and a user is permitted to access the molded crayon. In exemplary aspects, the cooling period is three minutes. The drawer 34 may remain locked until the end of the cooling period.

In some embodiments of the invention, when the drawer 34 is unlocked, a user may open the drawer 34 and retrieve the mold 32. The user may then open the mold 32 and pull out the molded wax formed in the cavity 52 of the mold 32.

The result will be a molded crayon product (shown in FIGS. 10-14), or a wax figurine in the shape of the predefined cavity 52.

When the automated crayon-molding device 10 is not presently being used to melt crayons, automated crayon-molding device 10 may enter into a standby mode. In the standby mode, the heating element 22 may keep the temperature of the inside of the crayon-melting chamber 20 at a standby temperature that is lower than the melting temperature. In one embodiment, the standby temperature may be 180 degrees Fahrenheit. By entering standby mode, the automated crayon-molding device 10 conserves energy because the heating element 22 does not have to maintain the higher melting temperature. By not cooling off completely, however, the automated crayon-molding device 10 further does not have to completely reheat to the melting temperature when being used to melt crayons again.

After a period of inactivity, the heating element 22 may turn off completely to allow the crayon-melting chamber 20 to cool down completely. This automated shut off function makes the automated crayon-molding device 10 safer for use in the home by preventing the automated crayon-molding device 10 from being left on and unattended for extended periods of time. In exemplary embodiments, the automated crayon-molding device 10 automatically shuts off after ten minutes of inactivity.

Though not shown in the figures, various lights may be used to indicate a particular stage of the crayon molding process to the user. In exemplary aspects, light-emitting diodes (LEDs) in different colors send different indications. For example, a first color LED, such as a red LED, may indicate whether the automated crayon-molding device 10 is on. In embodiments, the red LED may remain on when the automated crayon-molding device 10 is on and in active mode and when it is in standby mode, but the red LED may be off when the automated crayon-molding device 10 is completely shut down. In some aspects, the red LED may remain on after the heating element 22 turns off due to a period of inactivity but may turn off after the automated crayon-molding device 10 completely cools or returns to room temperature.

Additionally, the automated crayon-molding device 10 may also include a second color LED, such as a white LED, to indicate when a crayon 28 is ready to melt and/or the mold 32 is safe to remove. For example, the white LED may turn on after a mold 32 is dropped into the drawer 34 and the drawer 34 is closed, indicating that the user may press the activation button 26 to initiate the preheating and melting process. After the crayon 28 is completely melted and the cooling period has occurred, the white LED may turn off, indicating that the user may retrieve the mold 32 from the drawer 34 and open the mold 32. In some embodiments, the white LED may be located near the wax-receiving area 24, and the drawer 34 may be constructed from a transparent material so that a user can see the light from the LED when the drawer 34 is closed.

Another LED may be used to indicate to the user that the inside of the crayon-melting chamber 20 is being heated to the melting temperature. This LED may be the same LED as the LED that indicates when a crayon is ready to melt or may be different. As the area within the crayon-melting chamber 20 heats up, the frequency with which the LED flashes may gradually increase from a first frequency to a second frequency, providing real-time monitoring of the temperature as it increases. The frequencies may range from 0.5 Hertz to 10 Hertz. In exemplary embodiments, the first frequency is 1 Hertz and the second frequency is 4 Hertz. The increase of frequency of the flashing LED indicates that the temperature within the crayon-melting chamber 20 is getting closer to reaching melting temperature. As the frequency of the flashes corresponds to the actual temperature of the crayon-melting chamber 20, however, the first frequency may vary. For example, when a user first turns on the automated crayon-molding device 10 and is melting a crayon 28 for the first time that day, the temperature within the crayon-melting chamber 20 will be at its lowest and, therefore, the first frequency may be 1 Hertz. But if a user then melts a crayon 28 after the automated crayon-melting device 10 entered standby mode, the temperature inside the crayon-melting chamber 20 will be greater, and therefore, the first frequency may be 2 Hertz. In alternative embodiments, instead of flashing, the LED may increase brightness or change colors during the preheating time.

Figure 8:
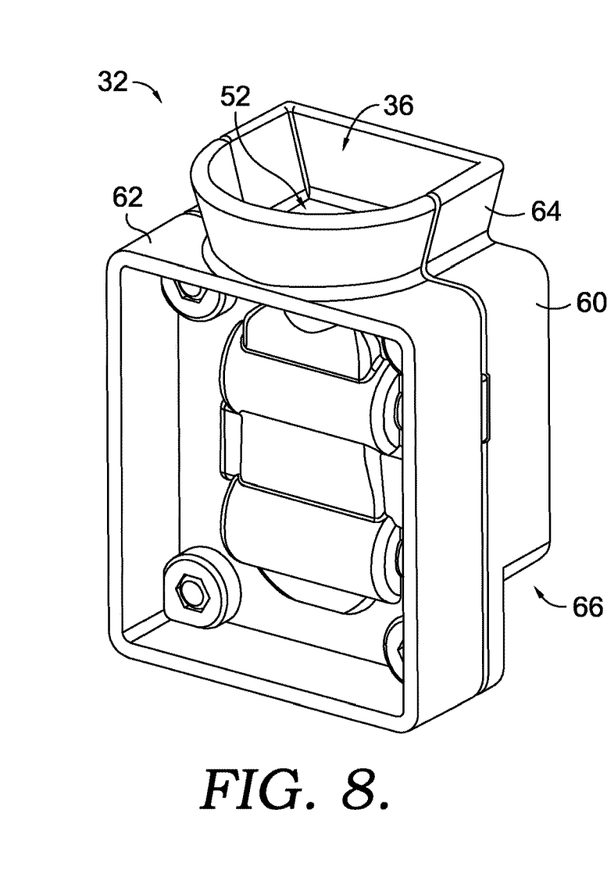
FIG. 8 is a perspective view of a mold in a closed position, in accordance with an embodiment of the invention.
Figure 9:
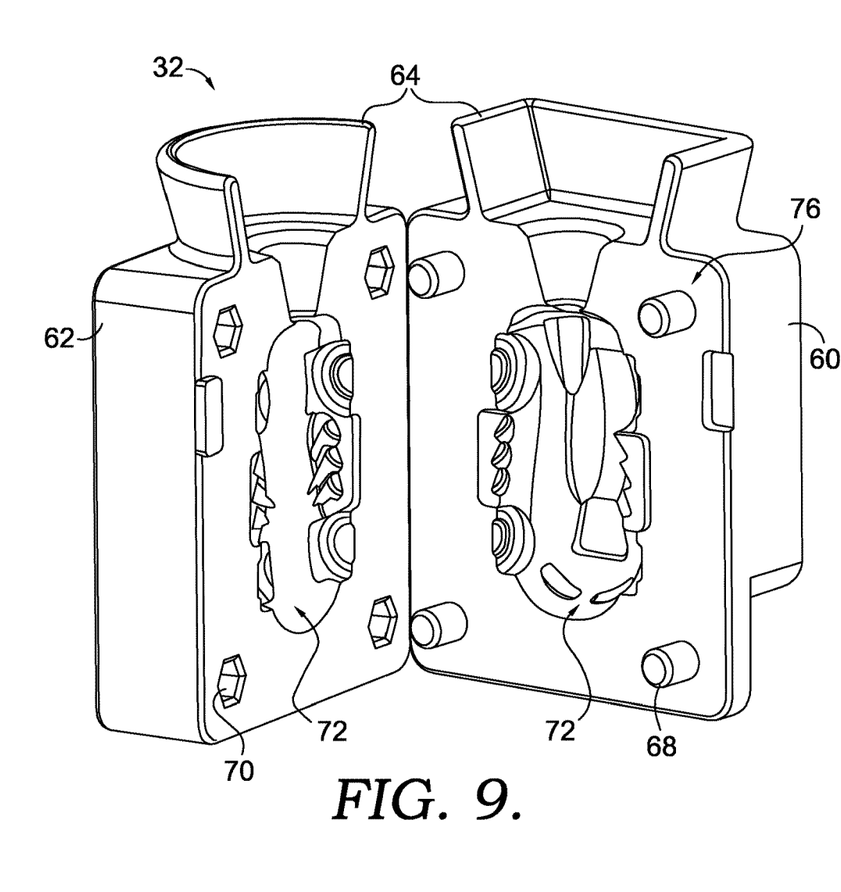
FIG. 9 is a perspective view of the mold of FIG. 8 in an open position, in accordance with an embodiment of the invention.

Turning to FIGS. 8-9, views of a mold 32 in a closed position and an open position are provided. The mold 32 may be generally a rectangular shape and comprise a first side 60 and a second side 62. The mold may be constructed from a variety of materials. In exemplary embodiments, the mold 32 may be constructed from polyolefin elastomers. In other embodiments, however, other materials may be used including ethylene propylene rubber, ethylene vinyl acetate, traditional rubber, polyvinyl chloride, and the like. Exemplary materials would include those that are rigid but semi-pliable to allow the user to pull apart the two sides 60 and 62 of the mold 32.

The mold 32 may also include a feature that works in connect with the drawer 34 to ensure proper placement of the mold 32 within the drawer. For example, an exterior surface of first side 60 of the mold 32 in FIG. 8 includes an indentation 66 that is not present on the second side 62. This indentation 66 on the mold 32 may correspond to drawer indentation 78 in the drawer 34, as seen in FIG. 5. When placing the mold 32 in the drawer 34, the mold 32 may be orientated so that the indentation 66 of the mold 32 and the drawer indentation 78 align. Otherwise, the mold 32 will not be able to sit fully within the drawer 34.

Turning back to FIGS. 8-9, the first side 60 and the second side 62 may be designed to be releasably coupled. For example, the first side 60 may include a plurality of pegs 68 that correspond to a plurality of holes 70 in the second side 62 such that, when placed together, the pegs 68 mate with the holes 70. In exemplary aspects, there will be four pegs 68 and four holes 70, and they will be located near the corners of the first side 60 and the second side 62, respectively. Further, in exemplary aspects, the pegs 68 may be a generally rounded shape while the holes may be a hexagonal shape to create optimal pairing and releasing.

Figures 10, 11, 12, 13, 14:
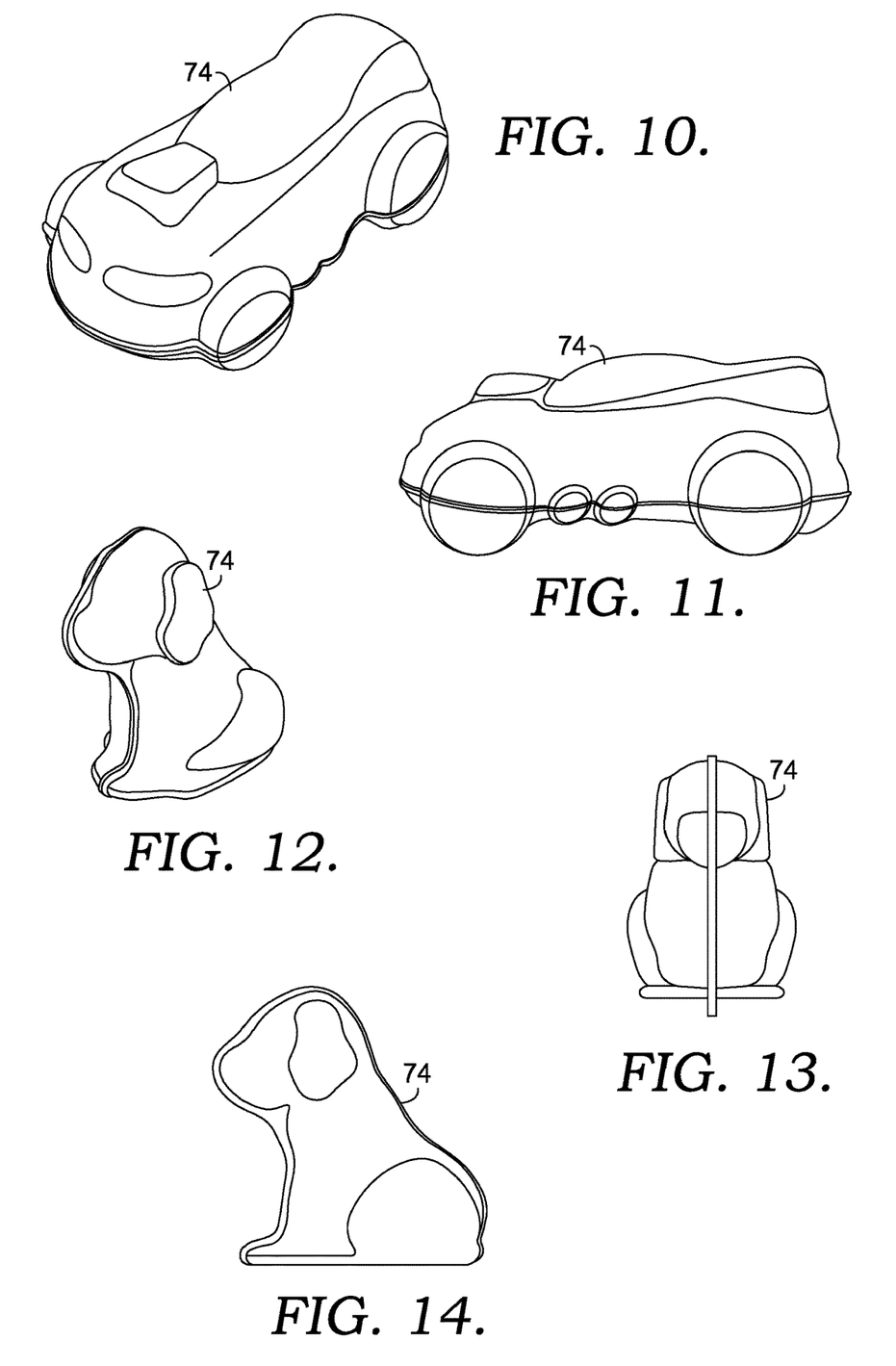
FIGS. 10-14 are various views of molded crayon products that can be created with the automated crayon-molding device, in accordance with an embodiment of the invention.

As seen from FIG. 8, the first and second side 60 and 62 include carved-out portions 72. When the first side and the second side 60 and 62 are coupled, the carved-out portions 72 form a cavity 52 in which melted wax is deposited. The shape of the cavity 52 formed by the carved-out portions 72 will dictate the shape of the molded crayon product 74. For example, the carved-out portions 72 may form a car when put together, as shown in FIGS. 8-9. The molded crayon product 74 created by the mold 32 would be in the shape of a car, as shown in FIGS. 10-11. Alternatively, other shapes may be created using different molds 32. For example, a dog-shaped molded crayon product 74 shown in FIGS. 12-14 may be made from a mold 32 having carved-out portion 72 that form a dog-shaped cavity when put together.

In exemplary aspects, the carved-out portions 72 are designed to allow a user to easily pull apart the first side 60 and the second side 62 while keeping the molded crayon product 74 intact. In some embodiments, when creating the carved-out portion 72 in the first side 60, every feature may be created at an optimal angle with relation to the plane of the surface 76 of the first side 60. For example, the features may be carved into the first side 60 at a 90 degree angle with respect to the plane of the surface 76 of the first side 60. The carved out portion 72 of the second side 62 may be similarly formed.

The cavity 52 formed by the carved-out portions 72 may lead to an opening 36 in the mold 32 through which melted wax can enter into the cavity 52. The opening 36 may be through a funnel-shaped piece 64 on the mold 32, providing optimal flow into the cavity 52. The funnel-shaped piece 64 may also function as a holder for excess wax. For example, if the cavity 52 can hold wax from one crayon, the funnel-shaped piece 64 may be able to hold the wax from an additional crayon. Accordingly, if too many crayons are inserted into the automated crayon-molding device 10 than is needed to form the molded crayon product 74, the mold 32 can hold the excess wax without it spilling over.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An automated crayon-molding device comprising:
   a crayon-receiving member having an opening at a first end configured to receive at least one crayon and a door configured to cover at least part of the opening at the first end, the door being opened when receiving the at least one crayon;
   an automated heating element;
   a crayon-melting chamber configured to receive the at least one crayon from the crayon-receiving member, wherein an inside of the crayon-melting chamber is heated by the automated heating element, wherein the door automatically closes over at least part of the opening at the first end upon either activation of the automated heating element or the inside of the crayon-melting chamber reaching a melting temperature; and
   at least one mold configured to receive melted wax from the crayon-melting chamber.

2. The automated crayon-molding device of claim 1, wherein the melting temperature is between 260 degrees Fahrenheit and 270 degrees Fahrenheit.

3. The automated crayon-molding device of claim 1 further comprising a drawer for holding the at least one mold while the at least one mold receives the melted wax.

4. The automated crayon-molding device of claim 3 further comprising one or more drawer-sensing mechanisms to detect when the drawer is in a closed position.

5. The automated crayon-molding device of claim 4, wherein the one or more drawer-sensing mechanisms prevent activation of the automated heating element when the drawer is not in a closed position.

6. The automated crayon-molding device of claim 3 further comprising one or more mold-sensing mechanisms to detect when the at least one mold is inside the drawer.

7. The automated crayon-molding device of claim 6, wherein the one or more mold-sensing mechanisms prevent activation of the automated heating element when the at least one mold is not inside the drawer.

8. The automated crayon-molding device of claim 1, wherein the at least one mold comprises a first side configured to couple to a second side, the first side and the second side forming a cavity when coupled together.

9. The automated crayon-molding device of claim 8, wherein the first side includes at least one hexagonal hole configured to receive at least one round peg on the second side when the first side and the second side are coupled together.

10. The automated crayon-molding device of claim 8, wherein the first side and the second side form a funnel-shaped opening that leads into the cavity.

11. The automated crayon-molding device of claim 1 further comprising at least one straining mechanism adjacent to an opening on a bottom end of the crayon-melting chamber.

12. The automated crayon-molding device of claim 1, wherein the automated heating element heats the inside of the crayon-melting chamber to a standby temperature when the automated heating element is in a standby mode.

13. The automated crayon-molding device of claim 12, wherein the standby temperature is about 180 degrees Fahrenheit.

14. The automated crayon-molding device of claim 1, wherein the automated heating element shuts off after a period of inactivity.

15. A crayon-molding system comprising:
   a crayon-receiving member having an opening at a first end configured to receive at least one crayon and a door configured to cover at least part of the opening at the first end, the door being opened when receiving the at least one crayon;
   an automated heating element;
   a crayon-melting chamber configured to receive the at least one crayon from the crayon-receiving member and that has at least one opening at a bottom portion, wherein an inside of the crayon-melting chamber is heated by the automated heating element, wherein the door automatically closes over at least part of the opening at the first end upon either activation of the automated heating element or the inside of the crayon-melting chamber reaching a melting temperature;
   a drawer positioned underneath the crayon-melting chamber; and
   at least one mold having a cavity and configured to receive melted wax when placed in the drawer.

16. The system of claim 15, wherein as the at least one crayon melts inside of the crayon-melting chamber, the melted wax continuously drips into the mold from the at least one opening on a bottom portion of the crayon-melting chamber, fills the cavity of the mold, and solidifies in a shape corresponding to the cavity as the melted wax cools.

17. The system of claim 15, wherein the crayon-receiving member further includes a closure mechanism at the second end configured to restrict travel of the at least one crayon through the crayon-receiving member, wherein the closure mechanism on the crayon-receiving member opens when the inside of the crayon-melting chamber reaches the melting temperature.

18. The automated crayon-molding device of claim 1, wherein the crayon-receiving member further includes a closure mechanism at the second end configured to restrict travel of the at least one crayon through the crayon-receiving member, wherein the closure mechanism on the crayon-receiving member opens when the inside of the crayon-melting chamber reaches the melting temperature.

* * * * *

UNITED STATES PATENT AND TRADEMARK OFFICE
CERTIFICATE OF CORRECTION

PATENT NO. : 10,647,030 B2
APPLICATION NO. : 15/424777
DATED : May 12, 2020
INVENTOR(S) : Robert Henry et al.

Page 1 of 1

It is certified that error appears in the above-identified patent and that said Letters Patent is hereby corrected as shown below:

In the Specification

Column 1, Line 8: "filed Feb. 5, 2016, having the" should read --filed Feb. 5, 2016, the--.

Signed and Sealed this
Fourth Day of August, 2020

Andrei Iancu
*Director of the United States Patent and Trademark Office*